Feb. 2, 1960
W. S. FLETCHER ET AL
2,923,268
AMPHIBIOUS VEHICLE
Filed Dec. 3, 1954
2 Sheets-Sheet 1
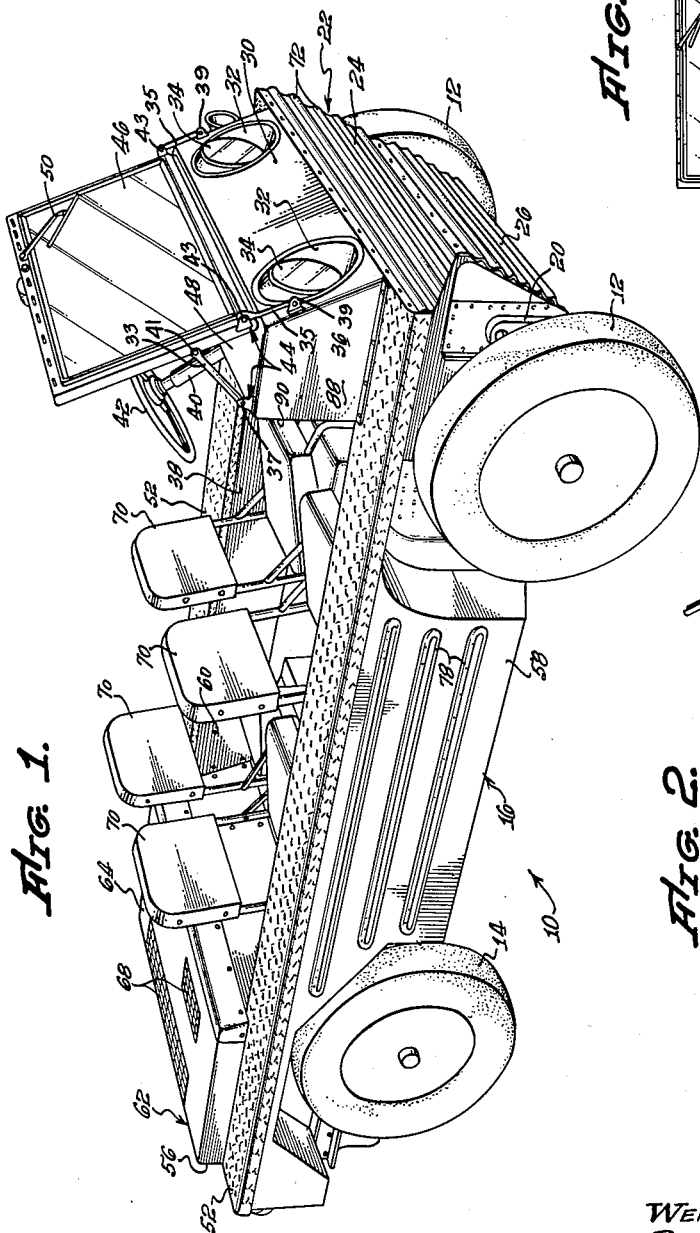
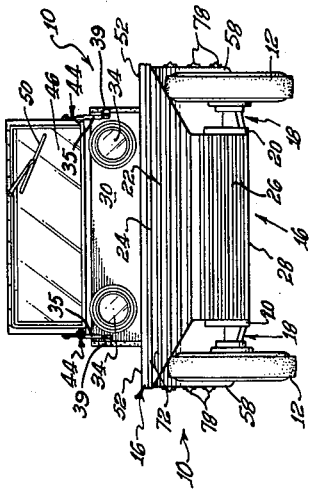
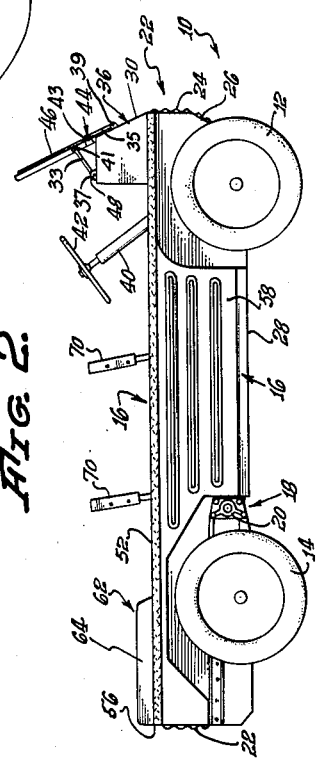
WENDELL S. FLETCHER,
BURTON L. SHANNON,
INVENTORS.
By THEIR ATTORNEYS.
HARRIS, KIECH, FOSTER & HARRIS.

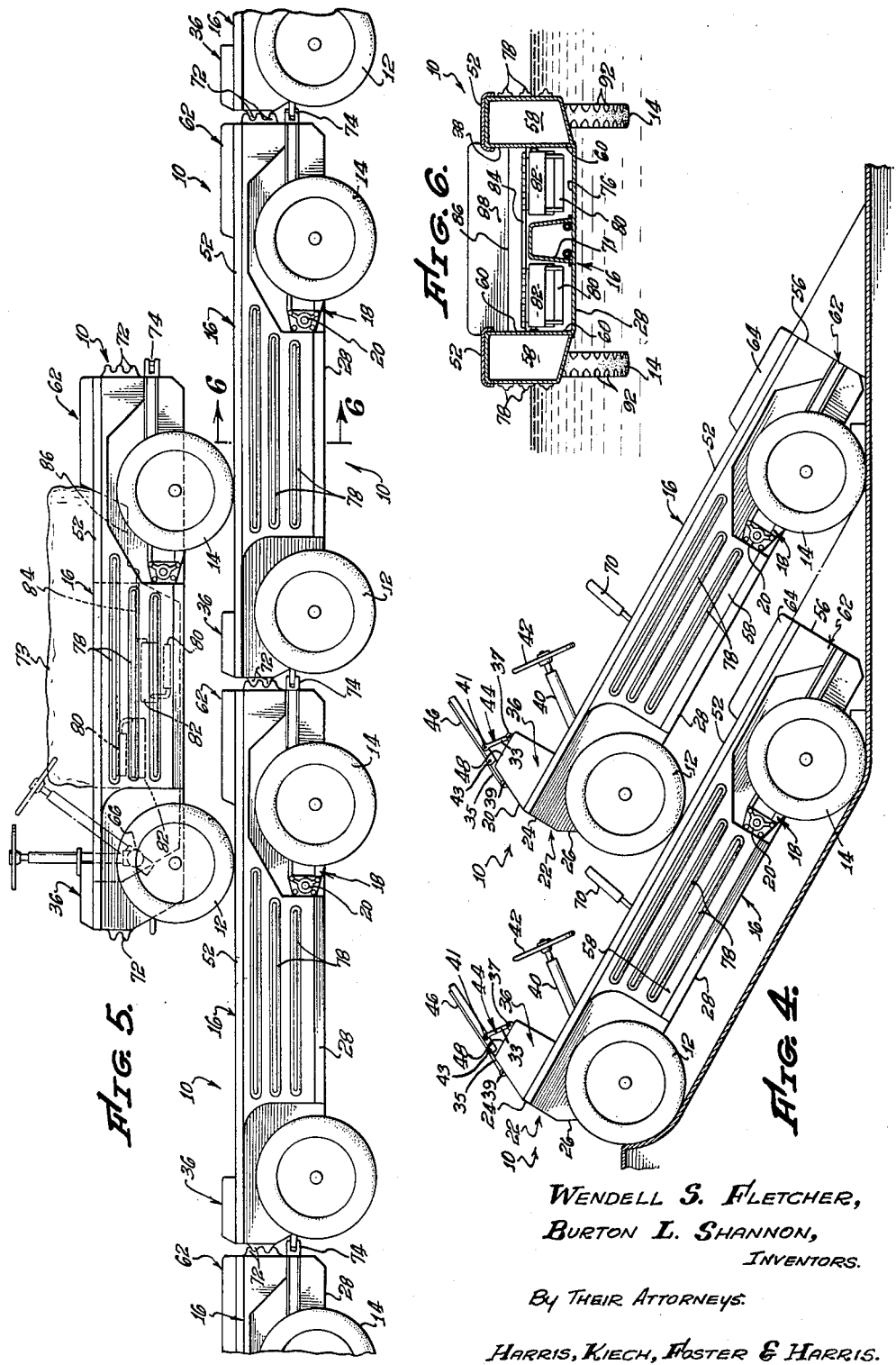

ced Feb. 2, 1960

2,923,268

AMPHIBIOUS VEHICLE

Wendell S. Fletcher and Burton L. Shannon, Pasadena, Calif., said Shannon assignor to said Fletcher Application December 3, 1954, Serial No. 472,968

4 Claims. (Cl. 115—1)

The present patent application pertains to new and improved automotive vehicles which are utilitarian in addition to being ornamental in appearance.

The present invention relates primarily to improvements in utilitarian automotive vehicles and more particularly to small compact rugged light weight vehicles adapted for multi-purpose use for the transportation of cargo or passengers.

The objects of the present invention are to provide:

(1) A small compact light weight vehicle of such construction as to facilitate airborne transportation of such a vehicle.

(2) A vehicle having a body of monocoque construction providing a strong rigid vehicle of minimum weight.

(3) To provide a self-propelled automotive vehicle having a buoyant water tight body of monocoque construction.

(4) To provide a light weight rugged vehicle of such improved construction that vehicles of this type may be stacked one on top of the other without damage thereto to facilitate storage and transportation thereof.

(5) To provide a light weight rugged amphibious vehicle of such construction that it may be utilized as a link of a pontoon bridge.

(6) To provide a vehicle having at each end a bumper structure of such improved construction that the bumper structure of similar vehicles will so interlock as to prevent relative vertical movement between the vehicles whereby thrust force may be transmitted between similar vehicles without producing substantial vertical movement of either of the vehicles thereby eliminating damage thereto.

The present invention may be briefly summarized as involving an automotive vehicle which comprises a body section, including what may be termed "square" end surfaces, side rail structural members, and four wheels, said body section being substantially water impervious so that the automotive vehicle of the present invention may float upon water. The invention is, of course, more fully summarized by the appended claims forming a part of this description. It is best more fully explained with reference to the accompanying drawings, in which:

Fig. 1 is an isometric view of an automotive vehicle of the present invention showing the design thereof;

Fig. 2 is a side view of the vehicle shown in Fig. 1;

Fig. 3 is a front view of the vehicle shown in Fig. 1;

Fig. 4 is a side view illustrating an advantageous feature of the automotive vehicles of the present invention;

Fig. 5 is a side view showing how modified automotive vehicles of the present invention may be employed in conjunction with one another in a given application; and Fig. 6 is a cross-sectional view taken at line 6—6 of Fig. 5.

In Figs. 1, 2 and 3 of the drawings there is shown an automotive vehicle 10 of the invention. It is considered obvious from these figures that this complete vehicle 10 is designed so as to be quite ornamental in appearance and so as to include front wheels 12 and rear wheels 14 which are attached to a water-impervious body section 16 by means of conventional supporting members 18 which pass through water-impervious bushings 20 secured to the body section 16. The supporting members 18 which are preferably employed with the automotive vehicle 10 are essentially those found in a type of car known by the name "Volkswagen." Inasmuch as these supporting members 18 are exceedingly conventional it is not considered necessary to set them forth in detail in this specification.

The body section 16 includes a front end 22 which possesses a flat front surface 24 and a sloping bottom surface 26 leading to the bottom 28 of the body section 16. Immediately above the front surface 24, the front end 22 includes a sloping top wall 30 having recesses 32 within which there are mounted conventional headlights 34. This top wall 30 forms part of what may be loosely termed a "dashboard" structure 36 which is designed to hold adjacent the interior 38 of the body section 16 a plurality of conventional instruments (not shown), and from which there is designed to be supported a steering column 40 upon which there is mounted in a conventional manner a steering wheel 42. Upon the top wall 30, mounting means 44 are provided so that a windshield 46 may, if desired, be secured in the position shown in Figs. 1, 2 and 3 of the drawings so as to in effect constitute an extension of the top wall 30. If desired, these mounting means 44 may be actuated in such a manner as to enable the windshield 46 to be rotated from the position shown to a position parallel to the top 48 of the dashboard 36. A conventional windshield wiper 50 is normally mounted upon the windshield 46 for the obvious purpose.

Mounting means 44 at opposite ends of windshield 46 comprises identical linkages each comprising a pair of links 33 and 35 pivoted respectively upon the dash board 36 at 37 and 39 and to the side of the frame of windshield 46 at 41 and 43. By these linkages, windshield 46 may be pivoted upon links 33 and 35 to a position parallel to the top of the dash board 36, links 33 and 35 pivoting in a counterclockwise direction as viewed in Figure 4 about their pivots 37 and 39 respectively during this movement.

When the windshield 46 is moved to a position parallel to the top 48 of the dashboard 36, it is secured to the body section 16 so as to be parallel to the bottom 28 of this body section 16, and so as to be parallel to side rails 52 forming an integral part of the body section 16. These side rails are preferably provided with a roughened top surface, as shown in Figs. 1, 2 and 3 of the drawings, and are so formed as to provide structural rigidity against undesired twisting of the body section 16 during operation of the vehicle 10. Thus, they are formed of a comparatively heavy gauge metal and serve as an integral structural part of this body section. As shown in the drawings, the side rails 52 extend completely from the front end 22 of the vehicle 10 to the rear end surface 56 of the body section 16. Between the front and end wheels 12 and 14 on both sides of the body section 16 enlarged tanks 58 are formed beneath the side rails 52, these tanks being secured to interior walls 60 of the body section 16 and having parallel exterior side walls. These walls 60, of course, form part of the interior 38 of this body section, and the tanks 58 provide additional rigidity to the vehicle 10 and the side rails 52.

Between the side rails 52 immediately in back of the rear wheels 14 there is provided an engine compartment 62 having a raised upper surface 64. In the compartment 62 there is disposed an engine which is designed to supply power to the rear wheels 14. Appropriate grills 68 are provided within the raised upper surface 64 for the purpose of introducing cooling air into the engine compartment 62 to insure proper operation of the engine.

Preferably, the engine employed with the invention is an air-cooled, four-cylinder, horizontally opposed type of engine such as is used in either a Volkswagen or a Porsche type of automotive vehicle. If desired, the exhaust gases from such engine may be vented out through the ventilating means 68, or may be sent out through exhaust openings (not shown) formed within the rear end 56 of the body section 16.

Within the interior 38 of the body section 16 foldable seats 70 are preferably mounted on the bottom 28. These seats are, in accordance with the preferred construction of the invention, secured in such a manner that they may be easily removed from the vehicle 10 in the event that it is desired to use this vehicle for purposes where these seats 70 may get in the way. An inverted U-shaped conduit 71 (Fig. 6) is secured to the bottom 28 to provide structural rigidity to the body section 16, and to house various control means (not shown).

One major advantage of the present invention lies in the fact that the automotive vehicles 10 are designed in such a manner that they may be readily stacked at an angle upon one another, as indicated in Fig. 4 of the drawings. When this occurs, the front wheels of one of the vehicles 10 are driven onto the side rails 52 of the next adjacent vehicle 10, substantially as shown in Fig. 4 of the drawings. A suitable ramp (not shown) is employed for this operation. This feature, while seemingly of comparatively minor significance, is actually of very major importance from a commercial standpoint. At least six of the vehicles constructed substantially as shown in Figs. 1, 2 and 3 of the drawings may be loaded into a conventional type of military cargo plane where a maximum of only four of a prior type of related vehicle could be loaded into the same plane, both types of vehicles being loaded so as to be capable of being pulled from the plane by parachutes with a minimum of effort. This advantage is quite material from a military standpoint inasmuch as the effective capacity of the plane is increased by a factor of approximately 50% or more.

Another major advantage of the present invention lies in the fact that the vehicles 10 are formed with front ends 22 having square front surfaces 24 and rear ends 56 which are also of a square configuration. The term "square" as employed here means that the front surfaces 24 and the rear ends 56 are located parallel to one another at right angles to the side rails 52 of the body section 16. By virtue of this construction, the vehicles 10 may either push or be pushed by another vehicle without difficulty. The utilitarian manner in which these vehicles may push or be pushed and the provision of large end surfaces for this operation are quite important in military operations where it is frequently impossible to align the bumpers of two adjacent vehicles, one pushing the other in the desired manner as when these vehicles are traveling over rough terrain.

A further advantage of the present invention lies in the fact that both the front surfaces 24 and the rear ends 56 of the vehicles shown in Fig. 1 of the drawings are provided with parallel projecting corrugations 72. The corrugations upon the front end 22 of one vehicle 10 are designed to engage the corrugations upon the rear end 56 of the next adjacent vehicle, in the broad manner shown in Fig. 5 of the drawings, preventing one vehicle from riding up on another during the operation thereof in pushing. This obviously prevents damage resulting from misalignment of two vehicles. It is substantially immaterial if the corrugations on the front end 22 of one vehicle 10 do not precisely match the corrugations upon the rear end 56 of the next adjacent vehicle so that the side rails 52 upon the two vehicles are precisely aligned with one another, inasmuch as the action of the corrugations 72 is the same regardless of how these corrugations are matched up with one another.

This feature of matching of the invention becomes quite important when the automotive vehicles 10 are intended to be used for military purposes in crossing a stream as a pontoon-like bridge. For such use, it is possible to form the vehicles 10 substantially as indicated in Fig. 5 of the drawings with the height of the dashboard 36 lowered so as to be approximately the same height as the top of the engine compartment 62. At this height, other vehicles 10 may be driven over a series of the vehicles 10 placed end-to-end in a chain-type fashion with the wheels upon the vehicle 10 being driven over the chain of vehicles 10 riding upon the side rails 52 of the lower vehicles. In effect, the side rails 52 in this application form a continuous track for automotive travel.

When the vehicles 10 are formed as shown in Fig. 5 of the drawings, the steering columns 40 include a universal joint 66 (Fig. 5) so that the steering wheels 42 may be rotated so as to be located within the body section 16. When these columns 40 are so formed, they may also be rotated to a vertical position as indicated at the top of Fig. 5 in order that an individual driving the vehicle 10 can sit upon cargo 73 substituted for the seats 70. When a chain of vehicles 10 is secured together as shown in Fig. 5 of the drawings, these vehicles in substance form what may be termed a "pontoon bridge," and conventional coupling member 74 which may consist essentially of a yoke and a rod may be secured to the body sections 16 of the vehicles 10 for securing these vehicles to one another so as to prevent unwanted misalignment. Other coupling means can, of course, be employed.

The precise nature of the structure of the body section 16 employed with the vehicles 10 is best indicated in Fig. 6 of the drawings. Here a cross-sectional view is shown which illustrates that the interior 38 of the body section 16 of an automotive vehicle 10 has interior walls 60 surrounded on the outside of the vehicle 10 by means of tanks 58. This interior 38 has a bottom 76 which forms a cargo-carrying surface. As is shown in Fig. 6 of the drawings, the two rear seats 70 of the vehicle may be folded with the construction shown so as to occupy the space in the vehicle normally occupied by the feet of those sitting within the rear seats when these seats are arranged in a "passenger" position. When this is done, preferably the backs 80 of the seats 70 are folded against the seat bottoms 82 and the seats 70 are rotated or moved so that the normally lower portions of the seat bottoms 82 are in an upward position. When this is done, it is frequently desirable to have a flat metal plate 84 which is hinged to these seat bottoms 82 rotated back so as to rest upon the U-shaped member 71. Thus, this flat sheet 84 forms together with the top of the U-shaped member 71 and the surfaces of the seat bottoms 82 a substantially flat cargo-carrying section immediately to the rear of the front seats 70 employed with the invention. This deck section terminates at a wall 86 forming a part of the engine compartment. Various conventional mounting means (not shown) are employed to secure the seats 70 in a "passenger" position.

Because of the construction of the present invention, the vehicle 10 readily floats upon water. The tanks 58, the rear engine compartment 62, and a compartment 88 formed between the front end 22 and an interior wall 90 located within the body section 16 may also be employed as separate buoyant sections serving to support the vehicle 10 in the event that either the body section 16 or any of the compartments or tanks indicated should cease to be water-impervious as by the vehicle 10 striking a log or other damaging object. If desired, the fuel normally carried within the tanks 58 can be replaced by air for buoyancy purposes.

With the vehicle 10, the wheels 12 and 14 are normally supplied with conventional tires 92, which, as indicated in Fig. 6 of the drawings, possess a treaded surface 92. Because of the buoyant nature of the vehicle 10 and the treaded surface 92, the vehicles formed as indicated herein can propel themselves to a surprising extent when floating upon the water either in a forward or a reverse direction without the aid of conventional means such as outboard motors, etc., for propelling these vehicles in the same medium. In addition, various types of conventional deck means (not shown) may be mounted upon the vehicles 10 between the side rails 52 when the seats 70 within such vehicles are removed from them or folded into the interior 38. Also, it is very convenient with the present invention to mount all sorts of guns, rockets, etc., upon either the bottom 76 of the body section 16 of a vehicle 10 of the invention, or within this vehicle by suspending such armaments between the side rails 52 or upon such deck means.

The exteriors of the tanks 58 are parallel to one another and are preferably formed with parallel projecting corrugations 78 which serve to provide structural rigidity to the tanks 58, enabling the vehicles 10 to be placed sideways to one another with corrugations 78 on one vehicle engaging the corrugations 78 on an adjacent vehicle 10 in the same manner in which the corrugations 72 described above are employed to engage one another. When the vehicles 10 are employed in this manner, a comparatively wide pontoon-type bridge may be formed utilizing a series of these vehicles.

It is considered obvious from the drawings that the automotive vehicles of the present invention are new, original, and ornamental in design, and, further, they are of comparatively wide utility and possess many features which are exceedingly utilitarian in category. Because of this, it is believed that the subject matter of the present disclosure is to be given wide latitude interpretation, and is to be limited only by the appended claims forming a part of this specification. A number of minor modifications may be made within the subject matter shown without departing from the essential teachings of the invention. As an example of such modifications, the vehicles of this invention may be provided with a four-wheel drive.

We claim as our invention:

1. A vehicle body adapted for direct suspension upon front and rear wheels, said body comprising a sheet metal assembly formed of a plurality of rigidly interconnected metallic sheets defining a hollow beam extending longitudinally of said body at each side thereof and constituting a mid portion of the longitudinal length of the vehicle body exterior side walls, a longitudinally extending hollow beam disposed between said side beams, a transversely extending bottom wall rigidly connected to the bottoms of each of said beams, at least two upwardly extending walls rigidly connected to each of said side beams and extending transversely of said body adjacent the opposite ends of said body, a rigid inverted channel beam substantially equal in length to the overall length of the vehicle body having longitudinally unobstructed flat top surfaces and rigidly attached to the top of each of said side hollow beams and projecting longitudinally beyond the ends thereof to define, in cooperation with the ends of said side hollow beam, wheel wells at the opposite ends of said hollow beams.

2. A light weight tactical automotive vehicle which includes: a semi-monocoque body defining a buoyant water tight open top shell; front and rear wheels associated with said body; a hollow fluid tight float chamber on each side disposed between the front and rear wheels on each side, each of said float chambers being in substantial alignment with the front and rear wheels between which it is interposed longitudinally of the vehicle, and the outboard walls of said float chambers being substantially coplanar with the vertical planes defined by the outer faces of the wheels when said wheels are in their normal positions whereby such chambers are protected to a large extent by the front and rear wheels from the danger of puncture by an object in the path of such vehicle.

3. A light weight amphibious automotive tactical vehicle of such construction that it may be readily loaded and unloaded from and transported in an aircraft comprising an open top water impervious body section defining a compartment for personnel and cargo; a front steer axle assembly having dirigible wheels at its outer ends, a rear drive axle having non-dirigible drive wheels at its outer ends, means suspending said body section upon said axle assemblies adjacent said wheels, an engine mounted within said body section at the rear thereof, drive means interconnecting said engine with said drive axle, and means defining rigid parallel horizontally extending side rails extending from the front to the rear of said automotive vehicle on the opposite sides thereof, each of said parallel side rails being in the form of an inverted longitudinally extending channel member extending over the front and rear wheels and having longitudinally unobstructed flat top surfaces and being secured to said body section and spaced apart transversely of said vehicle a distance equal to the transverse spacing between said wheels and the longitudinal and transverse profiles of said vehicle being such that said side rails can serve as a track for the wheels of both identical and similar automotive vehicles whereby such vehicle can be stacked in inclined relation between similar vehicles for transportation purposes without individual bracing of such vehicles by resting the front wheels of one vehicle against the side rails of the vehicle in front of it so that the wheels form shock absorbing cushions between vehicles while being transported.

4. A light weight amphibious tactical automotive vehicle of such construction that it may be readily loaded and unloaded from and transported in an aircraft comprising a water impervious semi-monocoque body section defining an open top compartment for personnel and cargo, a front steer axle assembly mounted on the front of said body section and having at the outer ends thereof dirigible wheels mounted exteriorly of said body section, a rear drive axle assembly mounted on said body section at the rear thereof and having wheels mounted exteriorly of said body section at the outer ends thereof, an engine mounted within said body section, drive means interconnecting said engine with said rear drive axle, means defining rigid, flat, parallel, horizontally extending side rails extending from the front to the rear of said automotive vehicle on both sides thereof secured to said body section; said side rails having longitudinally unobstructed flat top surfaces and being spaced apart transversely of said vehicle a distance equal to the transverse spacing between said wheels, the longitudinal and transverse profiles of said vehicle being such that said side rails can serve as a track for other automotive vehicles and whereby such vehicle can be stacked in inclined relation between similar vehicles for transportation purposes without individual bracing of such vehicles by resting the front wheels of one vehicle upon the side rails of the vehicle in front of it so that the wheels form shock absorbing cushions between vehicles while being transported, and a pair of fuel tanks connected to supply fuel to said engine and adapted when at least partially empty to function as float chambers when said vehicle is floating, said fuel tanks being mounted at the opposite sides of said body section beneath said side rails intermediate the front and rear wheels, the outboard walls of said tanks being substantially coplanar with the vertical planes defined by the outer faces of the wheels when said dirigible wheels are in normal position for protection by such wheels from damage by objects in the path of the vehicle.

References Cited in the file of this patent
UNITED STATES PATENTS

| | | |
|---|---|---|
| 32,403 | Seely | May 21, 1861 |
| 1,609,783 | Smith | Dec. 7, 1926 |

(References on following page)

UNITED STATES PATENTS

| | | | |
|---|---|---|---|
| 1,634,932 | Cook | July 5, | 1927 |
| 2,049,702 | Howe | Aug. 4, | 1936 |
| 2,100,383 | Davis | Nov. 30, | 1937 |
| 2,165,980 | Pritchard | July 11, | 1939 |
| 2,278,450 | Jones | Apr. 7, | 1942 |
| 2,371,811 | Ericsson | Mar. 20, | 1945 |
| 2,406,288 | Hait | Aug. 20, | 1946 |
| 2,451,284 | Garnett | Oct. 12, | 1948 |
| 2,490,162 | Ruelle | Dec. 6, | 1949 |
| 2,491,283 | Schoenrock | Dec. 13, | 1949 |
| 2,497,857 | Benson | Feb. 21, | 1950 |
| 2,578,052 | Evanoff | Dec. 11, | 1951 |
| 2,583,734 | Francis | Jan. 29, | 1952 |
| 2,704,989 | Koneony | Mar. 29, | 1955 |